US005487108A

United States Patent [19]
Atkins et al.

[11] Patent Number: 5,487,108
[45] Date of Patent: Jan. 23, 1996

[54] PROGRAMMABLE DIALLER FOR A MOBILE TELEPHONE

[75] Inventors: Richard S. Atkins, Ipswich, United Kingdom; Tommy W. Gibson, Tifton, Ga.; Philip P. Ransome, Port St Mary, United Kingdom

[73] Assignee: AGR Industries Limited, United Kingdom

[21] Appl. No.: 919,729

[22] Filed: Jul. 24, 1992

[30] Foreign Application Priority Data

Jul. 25, 1991 [GB] United Kingdom ............... 9116073

[51] Int. Cl.⁶ .................................................. H04M 1/57
[52] U.S. Cl. ........................ 379/355; 379/354; 379/58; 379/59; 379/60
[58] Field of Search ........................ 379/355, 356, 379/359, 199, 200, 56, 58, 59, 60, 91, 369, 68, 40; 455/89, 90, 66, 186.1

[56] References Cited

U.S. PATENT DOCUMENTS

| 4,482,787 | 11/1984 | Sagara et al. | 379/200 |
|---|---|---|---|
| 4,724,538 | 2/1988 | Farrell | 379/59 |
| 4,792,986 | 12/1988 | Garner et al. | 455/89 |
| 4,794,642 | 12/1988 | Arbabzadah et al. | 379/200 |
| 4,866,764 | 9/1989 | Barker, III | 379/355 |
| 4,947,422 | 8/1990 | Smith et al. | 379/355 X |
| 4,965,459 | 10/1990 | Murray | 379/200 X |
| 5,016,269 | 5/1991 | Rogers | 379/40 |
| 5,086,463 | 2/1992 | Vesely et al. | 379/40 |
| 5,155,860 | 10/1992 | McClure | 455/90 |
| 5,189,696 | 2/1993 | Yoshida | 379/355 |
| 5,193,215 | 3/1993 | Olmer | 455/66 |
| 5,200,995 | 4/1993 | Gaukel et al. | 379/200 |
| 5,230,092 | 7/1993 | Miyazawa | 455/186.1 |
| 5,249,302 | 9/1993 | Metroka et al. | 455/89 |
| 5,365,570 | 11/1994 | Boubelik | 379/369 |

FOREIGN PATENT DOCUMENTS 1597823  8/1981  United Kingdom ........... 379/200

OTHER PUBLICATIONS

Mitsubishi, Transportable Cellular Telephone, Model 1500 TPK, ©1991.

*Primary Examiner*—Jeffery A. Hofsass
*Assistant Examiner*—Jacques M. Saint-Surin
*Attorney, Agent, or Firm*—Rogers, Howell & Haferkamp

[57] ABSTRACT

A programmable dialler for a cellular telephone instrument allows telephone calls to be made only to specific, preprogrammed telephone numbers by operation of one or a sequence of keys on the instrument. The telephone numbers are deep embedded in the telephone instrument and cannot be changed by the user. The preprogramming may either be carried out by the instrument manufacturer, or may be carried out by a licensed programmer with the aid of a dedicated programming interface.

8 Claims, 1 Drawing Sheet

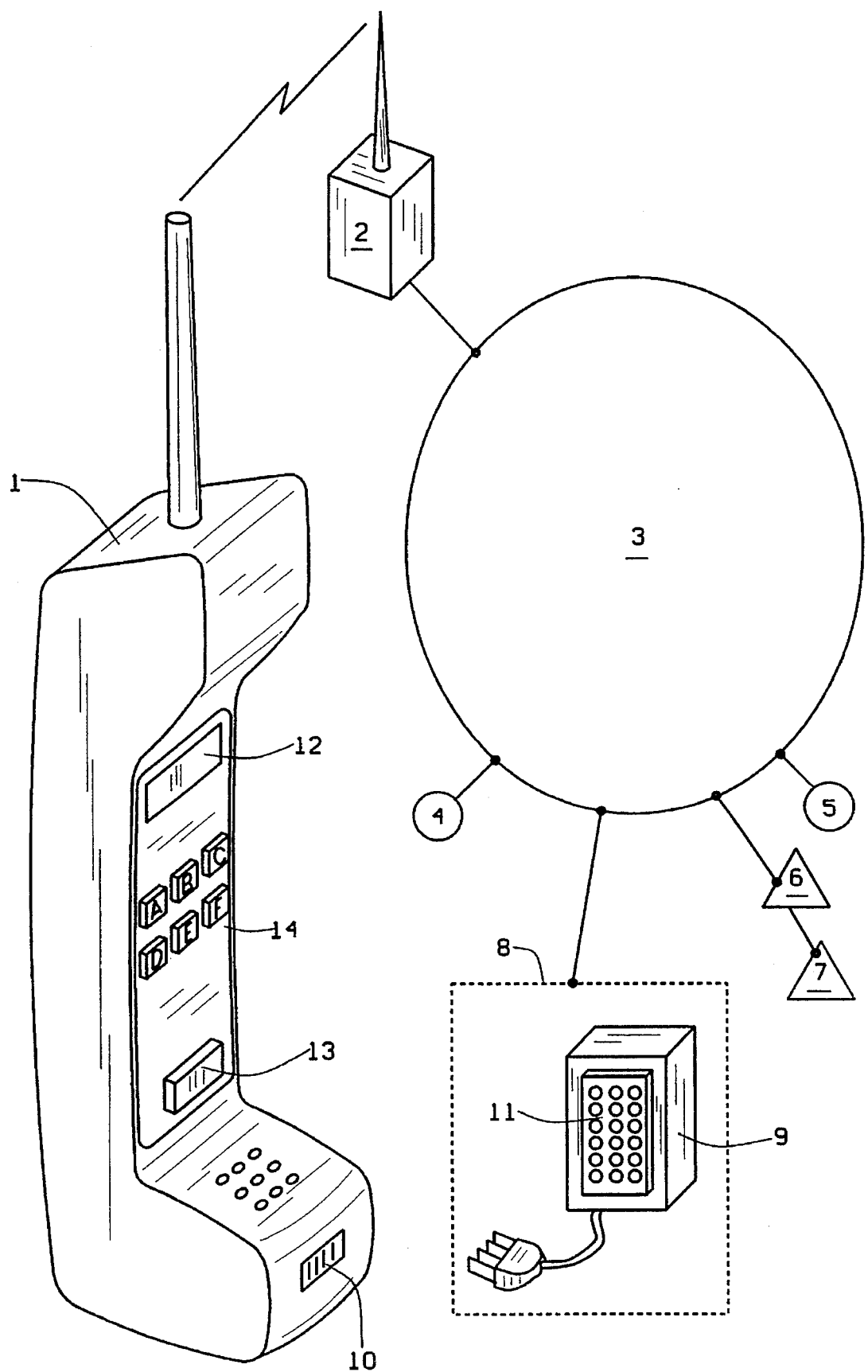

PROGRAMMABLE DIALLER FOR A MOBILE TELEPHONE

FIELD OF THE INVENTION

The invention relates to a programmable dialler for a mobile or cellular telephone.

BACKGROUND TO THE INVENTION

A common problem with companies who provide their employees with mobile (cellular) telephones is to restrict usage of the telephone for business purposes. This is an added problem if the taxation system discriminates between the use of the phone for business and for domestic purposes. Although it is possible to track calls from the computer printout of charged calls, good staff working relations may be lost if they are disciplined for unauthorized calls. It is considered likely that many more companies would use mobile telecommunication networks and permit more employees to have mobile telephones if their use could be limited to company business and the costs more tightly controlled. Additionally, organisations providing a motorist service, such as a breakdown service, may offer limited-use telephones for their customers to call them and possibly a few other telephone numbers, such as the police, their home and their work numbers.

The present invention seeks to provide a telephone instrument and a system for enabling only authorized calls to be made from mobile telephone instruments according to a preprogrammable repertory of authorized calls. The repertory of authorized calls is preset only by a licensed person or by the manufacturer so that the mobile telephone may be used only to call one or more authorized numbers. The number of preprogrammed calls which can be made will depend upon the particular needs of each company and each individual employee or user. However it is unlikely that more than 20 preset authorized numbers/keys would be made available and some instruments will have only one preset authorized number/key.

SUMMARY OF THE INVENTION

According to the present invention there is provided a programmable dialler for a mobile telephone instrument including a key or keys arranged, on actuation, to initiate a telephone call to a respective predetermined authorized telephone number.

The dialler and/or the instrument can include circuitry to output a specific telephone number in response to the actuation of a specific key or sequence of keys. Alternatively the dialler can be adapted to output to a base station a specific code which is not a telephone number but which will be recognised by the base station and will cause the base station to make or connect a telephone call to a specific telephone number.

If required, a plurality or all of the keys may be preset to the same predetermined telephone number. However, one or more of the keys may be allocated for emergency help purposes to dial a number which is permanently manned to accept emergency calls and to respond by providing or accessing the necessary help. The keys cannot be used to initiate a call by the normal method of selecting a sequence of 0–9 keys corresponding to the digits of the required telephone number. Preferably the predetermined authorized telephone numbers associated with respective keys may only be set or changed by the manufacturer or a licensed person who holds a coding device which may be coupled to the telephone instrument for the purpose of setting and/or changing authorized telephone numbers.

BRIEF DESCRIPTION OF THE DRAWING

One embodiment of the invention will now be described, by way of example, with reference to the accompanying drawing which shows schematically a programmable dialler according to the invention.

DESCRIPTION OF THE PREFERRED EMBODIMENT

The drawing shows a mobile cellular telephone instrument 1 connected by way of a cellular radio base station 2 of a telephone network 3 to a limited number of authorized locations, for example customers 4 and 5 and to company manufacturing locations 6 and 7.

The instrument 1 shown in the drawing has a keypad 14 with only six keys designated by the letters A,B,C,D,E and F. Each of these keys has been preprogrammed to initiate a telephone call to a predetermined telephone number. It is not possible for the user of the instrument to change these preprogrammed numbers; neither is it possible for any calls to be made from the instrument to any telephone numbers other than those preprogrammed numbers. The preprogramming may require the user to press either a single key or a combination of the keys on the pad 14 in order to initiate a call to a particular authorized telephone number. Circuitry may be provided within the instrument 1 to output a specific preprogrammed phone number in response to the pressing of a specific key or combination of keys, or alternatively the airtime provider may provide circuitry which, in response to the receipt of a specific code from the instrument 1, outputs a call to the preprogrammed number.

At a licensed location 8 there is a programming device 9 which is used to deep embed specific codes into the instrument 1. The device 9 plugs into a socket 10 on the telephone instrument 1. The purpose of the programming device 9 is to preset or to change any one or more of the authorized numbers. The device 9 contains a key pad 11 which is used for programming the authorized numbers. An electronic security code may enable the keypad 11 so that it remains inoperable and electronically locked in a known manner until the correct combination of numbers is keyed in. The device 9 may also contain an alpha/numeric keyboard enabling words as well as numbers to be programmed into the telephone instrument so that, in use, the telephone instrument provides a visual display 12 by means of an LCD indicating the person/location and telephone number associated with each programmed key when it is operated. The plug/socket 10 connection between the device 9 and the telephone instrument 1 may be replaced with an induction coupling, with an infra-red coupling or a laser coupling, or by remote radio transmission/instruction. A remote instruction of this type can be used to allow a call to be made to a specific number one time only.

It may be desirable for the programming device 9 to be held by the instrument suppliers so that the instruments are sold preprogrammed. This is the case particularly when a single telephone number may be the only one required. For example parents could provide their children with a telephone instrument through which they could only call home at any time.

Alternatively a distinctive key 13 could actuate a single telephone number which is an emergency help number manned 24 hours a day and staffed with people capable of assessing the problem and providing the necessary assistance.

The telephone instruments can be arranged as required to accept incoming calls. However, because cellular telephone networks are not set up to provide transfer charge calling in to a mobile telephone no unauthorized charges will be generated through incoming calls.

It will be appreciated that all calls made from the telephone instrument will be logged in the normal manner by the charging computer and only authorized calls connected to the telephone system operator. The preprogrammed telephone instrument may be portable or mounted in a vehicle.

In one specific application of the invention a mobile/transportable instrument may be offered to customers as an additional service facility by a motorist breakdown organisation. The telephone instrument can have a limited set of push-button operated switches each of which is arranged to actuate a preprogrammed dialling-out circuit, programmed by the motorist organisation to provide one or more preselected numbers. The motorist organisation may provide one key always programmed to their own breakdown number and a second key always programmed to a police or general emergency number as basic facilities within the set-up costs of the additional service. Any additional preprogrammed keys may be separately costed and selected by the customer. If necessary the telephone could be arranged to provide only out-going calls.

It will be appreciated that there are other specific applications of the invention which would enable commercial organisations to provide an enhanced service for their customers.

We claim:

1. A dialler for a cellular mobile telephone instrument including a key or keys arranged, on actuation, to send a code to a memory which results in an initiation of a telephone call to a respective predetermined authorized telephone number embedded in the dialler, wherein the predetermined authorized telephone number or numbers associated with the keys are configured to be set or changed only by using coding means external to the telephone instrument.

2. A dialler as claimed in claim 1, which includes circuitry to output a specific telephone number in response to the actuation of a specific key or sequence of keys.

3. A dialler as claimed in claim 1, adapted to output to a base station a specific code which is not a telephone number but which is recognized by the base station and causes the base station to make or connect a telephone call to a specific telephone number.

4. A dialler as claimed in claim 1, wherein one or more of the keys is allocated for emergency help purposes to dial a predetermined authorized telephone number.

5. A dialler as claimed in claim 1, wherein the dialler is configured such that the keys cannot be used to initiate a call by the normal method of selecting a sequence of 0–9 keys corresponding to the digits of a desired telephone number to be called.

6. A dialler as claimed in claim 1, wherein setting and/or changing authorized telephone numbers requires a coding device to be coupled to the telephone instrument.

7. A programmable dialler for a cellular mobile telephone instrument including a key or keys arranged, on actuation, to initiate a telephone call to a respective predetermined authorized telephone number, wherein the dialler is adapted to output to a base station a specific code which is not a telephone number but which will be recognized by the base station and will cause the base station to make or connect a telephone call to a specific telephone number.

8. A telephone instrument comprising:

a memory for storing a predetermined telephone number, wherein the telephone number is configured to be set or changed by using coding means external to the telephone instrument; and a dialler having a key configured such that upon actuation of the key a code is sent to the memory which results in an initiation of a telephone call to the predetermined telephone number.

\* \* \* \* \*